Dec. 30, 1941. E. B. HUDSON ET AL Re. 21,988

NEEDLE ROLL COLD REDUCTION MILL

Original Filed Jan. 12, 1938

INVENTORS.
EDWIN B. HUDSON
AND ROBERT S. BURNS.
BY Allen & Allen
ATTORNEYS.

Reissued Dec. 30, 1941

Re. 21,988

UNITED STATES PATENT OFFICE 21,988

NEEDLE ROLL COLD REDUCTION MILL

Edwin B. Hudson and Robert S. Burns, Middletown, Ohio, assignors to The American Rolling Mill Company, Middletown, Ohio, a corporation of Ohio Original No. 2,165,266, dated July 11, 1939, Serial No. 184,645, January 12, 1938. Application for reissue July 14, 1941, Serial No. 402,330

9 Claims. (Cl. 80—31.1)

This invention relates to cold reduction mills and more particularly to mills having very small working rolls, sometimes referred to as needle rolls.

Attempts have been made in the past to build mills having small working rolls but these attempts have not been entirely successful, due to horizontal deflection of the working rolls. When conventional backing rolls are used, it is impossible to stay the small working rolls in a horizontal plane. Another limiting factor, which is encountered particularly in four high mills where the working rolls are driven, is the torque capacity of the roll necks.

With the above difficulties in mind, it is an object of our invention to provide a rolling mill construction by means of which we are enabled to use very small working rolls, whereby we are able to attain to a greater degree, the known advantages of small rolls, such as the ability to make high reductions per pass with relatively low screw pressures, whereby the weight of the machine may be considerably reduced.

It is another object of our invention to provide a rolling mill construction in which the working rolls are supported throughout their entire length by means of a half bearing and to rotate the working rolls by means of the driving action of the strip.

The last mentioned object of our invention involves the solution of the problem of relative friction between the roll and the work and between the roll and its supporting bearing. It is, therefore, another object of our invention to provide a construction in which the friction between the roll and its supporting bearing is very low in relation to the friction between the roll and the work.

These and other objects of our invention, which will be apparent to one skilled in the art or which will be pointed out more specifically hereinafter, we accomplish by that construction, and arrangement of parts and by that method of which we will now describe an exemplary embodiment.

Reference is now made to the drawing forming a part hereof and in which.

Figure 1:
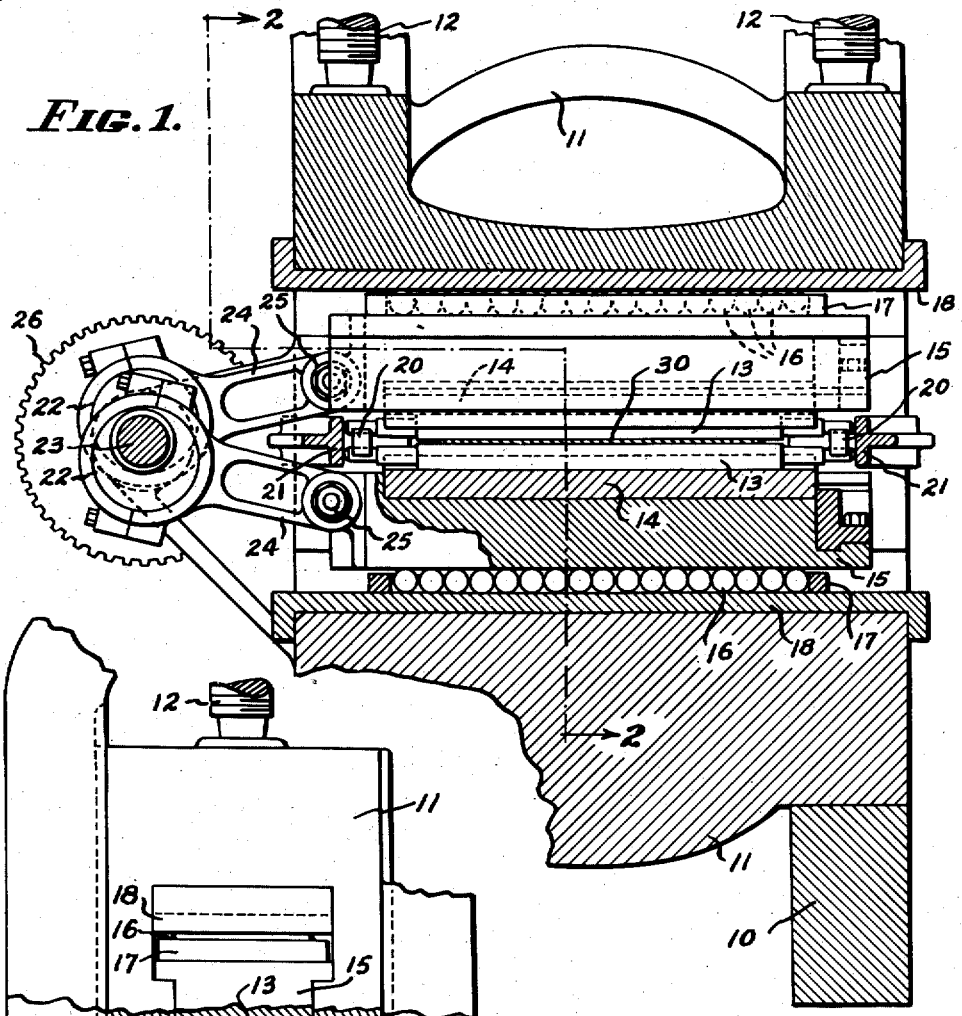
Figure 1 is a vertical transverse cross sectional view of a mill, according to our invention.

Briefly, in the practice of our invention, we provide a mill which is preferably equipped with a coiler on the entrance side of the mill and another coiler on the exit side of the mill, said coilers being provided with motors which supply the total power for the reduction of gauge. The mill rolls are preferably driven by the strip. The mill rolls are of very small diameter and are mounted in half-bearings and maintained in a fixed lateral position in relation to the strip and the mill, which bearings are arranged to be reciprocated longitudinally of the rolls to greatly reduce the friction between the rolls and the bearings without reducing the friction between the strip and the rolls. Referring more particularly to the drawing, we have indicated generally, a mill having housings 10, in which are supported transverse beams 11, which are supported in windows in the housings 10. The mill may be provided with a conventional screw down including the screws 12, which are shown in contact with the upper transverse beam 11.

Figure 2:
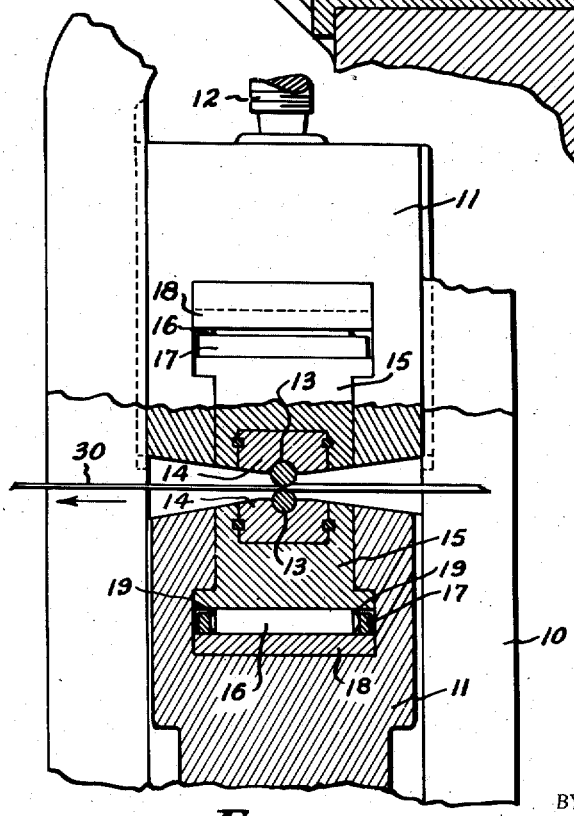
Figure 2 is a cross sectional view of the same, taken on the line 2—2 of Figure 1.

The working rolls 13, as most clearly shown in Figure 2, are carried in cast iron bearing members 14, which are provided with semi-cylindrical bearing grooves for the rolls 13, the bearing members 14 supporting the members 13, throughout their working length. The bearing members 14, are carried in reciprocating members 15, in any desired or conventional manner and the members 15, respectively, ride upon a series of rolls 16, which are carried between cages 17, and which ride on the hardened plates 18. The hardened plates are supported in the beams 11.

The rolls 16, are provided with hemispherical ends 19, which bear against the cages 17. The working rolls 13, are necked down to a smaller diameter at their ends, to take the rubber separating bearings 20, as best seen in Figure 1. At their ends, the rolls 13, are also made hemispherical so that they may be held against lateral movement by means of the staying plates 21.

Provision is made for reciprocating the members 15, as follows: Eccentrics 22, are mounted upon a shaft 23, and are provided with connecting rods 24, one of which is connected to each of the members 15, in conventional manner as indicated generally at 25. The shaft 23, may be provided with a gear 26, which may be driven through any desired linkage, by one of the coiler motors or, if desired, by separate motor.

It will now be clear that as the shaft 23, is rotated, the bearing carrying members 15, will be caused to reciprocate back and forth, riding on the hardened rolls 16, while the working rolls 13, will be held against lateral movement by contact of their ends with the staying plates 21. In this way, friction between the working rolls and their bearings, is greatly reduced while at the same time, the bearings stay the thin working rolls against deflection in a horizontal plane as well as in a vertical plane. At the same time, the friction between the working rolls and the strip 30, is not reduced so that the rolls 13, may be freely driven by the strip.

It will be clear from the above description, that we have provided a mill construction in which working rolls of any desired small size, may be used without encountering the difficulties enumerated above. It will also be clear that modifications may be made in our invention without departing from the spirit thereof. We, therefore, do not intend to limit ourselves except as pointed out in the claims which follow.

Having now fully described our invention what we believe to be new and desire to secure by Letters Patent is:

1. That method of controlling frictional relationships in a pull mill, which includes the steps of supporting the working rolls throughout their operative length, and moving the working roll supports parallel to the axis of said rolls while maintaining the rolls against axial movement transverse to the direction of rolling.

2. The method of operating a strip mill which includes the steps of supporting the working rolls throughout their operative length, and reciprocating the working roll supports parallel to the axes of said rolls while pulling strip through the working rolls and while maintaining said rolls against axial movement transverse to the direction of rolling.

3. In a rolling mill a pair of working rolls, supporting bearings for said working rolls, means for reciprocating said supporting bearings parallel to the axes of said rolls to reduce friction between said bearings and said rolls, and means for maintaining the rolls against axial movement transverse to the direction of rolling.

4. In a rolling mill, a pair of working rolls, supporting bearings for said working rolls, said bearings comprising semi-cylindrical grooves in which said working rolls rest and which support said rolls throughout their entire working length, and means for reciprocating said supporting bearings in a direction substantially parallel with the axes of said rolls to reduce friction between said bearings and said rolls.

5. In a rolling mill, a pair of working rolls, supporting bearings for said working rolls, said bearings comprising semi-cylindrical grooves in which said working rolls rest and which support said rolls throughout their entire working length, and means for reciprocating said supporting bearings to reduce friction between said bearings and said rolls, said reciprocating means including a driven shaft, eccentrics mounted on said shaft, and connecting rods connecting said eccentrics with said supporting bearings.

6. In a rolling mill, a pair of working rolls, supporting bearings for said working rolls, said bearings comprising semi-cylindrical grooves in which said working rolls rest and which support said rolls throughout their entire working length, and means for reciprocating said supporting bearings to reduce friction between said bearings and said rolls, said reciprocating means including a driven shaft, eccentrics mounted on said shaft, in diametrically opposed relation and connecting rods connecting said eccentrics with said supporting bearings.

7. In a rolling mill having housings and transverse beams, hardened bearing surfaces mounted in said beams, bearing members mounted for reciprocatory movement in said beams, bearing rollers mounted between said bearing members and said hardened bearing surfaces to carry said bearing members in said reciprocatory movement, said bearing members being provided with semi-cylindrical bearing grooves, and working rolls having their bearing in said grooves and being thereby supported throughout their entire working length.

8. In a rolling mill having housings and transverse beams, hardened bearing surfaces in said beams, a pair of relatively thin working rolls, retaining means for holding said rolls against axial movement, bearing elements for taking the working pressure on said rolls, and spacing blocks for maintaining a pass clearance when no stock is between the rolls, said bearing elements having semi-cylindrical grooves to seat said rolls and being mounted for reciprocating movement in a direction substantially parallel with the axes of said rolls, said mounting including rollers riding between said bearing elements and said hardened bearing surfaces, and means for reciprocating said bearing elements while stock is passing through the mill.

9. In a rolling mill having housings and transverse beams, hardened bearing surfaces in said beams, a pair of relatively thin working rolls, retaining means for holding said rolls against axial movement, bearing elements for taking the working pressure on said rolls, and spacing blocks for maintaining a pass clearance when no stock is between the rolls, said bearing elements having semi-cylindrical grooves to seat said rolls and being mounted for reciprocating movement in a direction substantially parallel with the axes of said rolls, said mounting including rollers riding between said bearing elements and said hardened bearing surfaces, retaining means for said rollers and means for reciprocating said bearing elements while stock is passing through the mill.

EDWIN B. HUDSON.
ROBERT S. BURNS.